US007877465B2

(12) United States Patent
Kontamsetty et al.

(10) Patent No.: US 7,877,465 B2
(45) Date of Patent: Jan. 25, 2011

(54) PROVIDING ARTIFACT AND CONFIGURATION COHESION ACROSS DISPARATE PORTAL APPLICATION MODELS

(75) Inventors: Prasant K. Kontamsetty, Cary, NC (US); Srikanth Thirumalai, Chapel Hill, NC (US); Michael C. Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 10/891,287

(22) Filed: Jul. 14, 2004

(65) Prior Publication Data

US 2006/0015594 A1 Jan. 19, 2006

(51) Int. Cl.
*G06F 15/177* (2006.01)
(52) U.S. Cl. ........................ 709/220; 709/221
(58) Field of Classification Search .............. 709/220, 709/221
See application file for complete search history.

(56) References Cited

U.S. PATENT DOCUMENTS

| 5,899,989 | A | 5/1999 | Ikeuchi et al. | |
|---|---|---|---|---|
| 6,393,605 | B1 | 5/2002 | Loomans | |
| 6,625,643 | B1* | 9/2003 | Colby et al. | 709/217 |
| 6,654,784 | B1 | 11/2003 | Wei | |
| 2002/0032763 | A1 | 3/2002 | Cox et al. | |
| 2002/0059425 | A1* | 5/2002 | Belfiore et al. | 709/226 |
| 2003/0050834 | A1 | 3/2003 | Caplan | |
| 2003/0055970 | A1 | 3/2003 | Kourtidis | |
| 2003/0105888 | A1 | 6/2003 | Connelly et al. | |
| 2003/0120502 | A1* | 6/2003 | Robb et al. | 705/1 |
| 2003/0212987 | A1 | 11/2003 | Demuth et al. | |
| 2003/0220989 | A1* | 11/2003 | Tsuji et al. | 709/220 |
| 2004/0068554 | A1* | 4/2004 | Bales et al. | 709/218 |
| 2004/0216036 | A1* | 10/2004 | Chu et al. | 715/501.1 |

OTHER PUBLICATIONS

Esposito, D., "Hosting .Net Applications in the Browser", INSPEC Abstract No. C2003-06-6150N-0901, Publisher: CMP Media LLC, Publication Date: Feb. 2003.
Esposito, D., "Power to the Client", INSPEC Abstract No. C2000-12-7250N-019, Publisher: Matt Publishing, Publication Date: Sep.-Oct. 2000.

* cited by examiner

*Primary Examiner*—George C Neurauter, Jr.
*Assistant Examiner*—Mark D Fearer
(74) *Attorney, Agent, or Firm*—Marcia L. Doubet

(57) ABSTRACT

Under the present invention, a client-based editor is launched (e.g., from a web server or the like) within a client interface such as a browser. Upon being launched, initial configuration parameters are passed from a portal server to the editor. The present invention also provides a "communications tunnel" between the editor and the portal server in the form of a portlet interface on the web server. This is so that any characteristics expressed by the portal server (e.g., changes to the initial configuration parameters) can be pushed to the editor. Moreover, the portlet interface allows the editor to query the portal server to obtain any needed services (e.g. a spreadsheet computation).

22 Claims, 2 Drawing Sheets

PROVIDING ARTIFACT AND CONFIGURATION COHESION ACROSS DISPARATE PORTAL APPLICATION MODELS

BACKGROUND OF THE INVENTION

1. Field of the Invention

The present invention generally provides a system, method and program product for providing artifact and configuration cohesion across disparate portal application models.

2. Related Art

Web portals have become an increasingly popular means of delivering aggregated, targeted content to computer users. A portal page is typically rendered and delivered from a portal server. A portal program (e.g., WebSphere Portal Server from International Business Machines Corp. of Armonk, N.Y.) on the web server obtains and aggregates portal content into the portal page. As known, the portal page includes sections or visual portlets that each contain particular portal content formatted according to certain preferences. In a growing number of instances, portal pages are being used by companies as a way to provide information to potential customers. For example, a portal page for a company could include a portal containing general information and one or more other portals containing information about available goods and/or services.

Over the past few years, the pendulum of technology used to build portal page-based websites and web applications has moved from simple static pages to dynamic and interactive pages. These rich web applications are typically a combination of client-side technology (e.g., Javascript, VBscript, Flash, Applets, etc.) and server-side components (e.g., Portlets, Servlets, JSPs, etc.). The natural commingling of functionality and ubiquity of the rich client technologies allows web application designers to create highly interactive, yet centrally managed applications. Thus, many companies now view the combination of client-side scripting technologies in combination with traditional server side components as a viable and capable platform for advanced web application development and delivery.

Traditionally, portal editors built using client-side technology and server-side components are encapsulated as standalone packages (e.g., WAR, EAR, etc.) so that they can be reused as a component in an overall system, while benefiting from the characteristics of standalone applications (e.g., packaging, installation, clustering, etc.) An example of this is combining "on-demand" editors with document management facilities in the portal server. Unfortunately, this sort of interaction stresses the boundaries of the J2EE specification for inter-servlet communication and artifact sharing. Additionally, this integration into portal platforms becomes very problematic due to the nature of the portlet application model. Specifically, portlets assume control of the overall programming model and thus, do not provide sufficient facilities for application integration into these standalone, rich browser applications. This is troublesome in view of the fact that portlets traditionally play the role of the user interface in the orchestration of an overall application.

Since this combination-based programming model will only become further solidified within the industry with the advent of the JSR168 portlet specification, a system/process is needed to augment disparate programming models to allow for the seamless integration of applications. That is, in a system that commingles portal-based applications and rich client-side technology (e.g., advanced productivity editors), the cohesion of various environmental artifacts such as the current portal theme or portlet configuration settings is needed. This is especially needed in view of the disconnected nature of traditional portal navigation and editor interfaces.

SUMMARY OF THE INVENTION

In general, the present invention provides a system, method and program product for providing artifact and configuration cohesion across disparate portal application models. Specifically, under the present invention, a client-based editor is launched (e.g., from a web server or the like) within a client interface such as a browser. Upon being launched, initial configuration parameters are passed from a portal server to the editor. The present invention also provides a "communications tunnel" between the editor and the portal server in the form of a portlet interface on the web server. This is so that any characteristics expressed by the portal server (e.g., changes to the initial configuration parameters) can be pushed to the editor. Moreover, the portlet interface allows the editor to query the portal server to obtain any needed services (e.g. a spreadsheet computation).

A first aspect of the present invention provides a system for providing artifact and configuration cohesion across disparate portal application models, comprising: an editor system for launching an editor for a portal page in a client interface, and for passing initial configuration parameters to the editor from a portal server; an artifact assimilation system for applying characteristics expressed by the portal server to the editor; and a query system for retrieving services from the portal server to the editor based on a query from the editor.

A second aspect of the present invention provides a method for providing artifact and configuration cohesion across disparate portal application models, comprising: launching an editor for a portal page in a client interface from a web server; passing initial configuration parameters to the editor from a portal server applying characteristics expressed by the portal server to the editor; and querying the portal server to retrieve services from the portal server to the editor.

A third aspect of the present invention provides a program product stored on a recordable medium for providing artifact and configuration cohesion across disparate portal application models, which when executed comprises: program code for launching an editor for a portal page in a client interface, and for passing initial configuration parameters to the editor from a portal server; program code for applying characteristics expressed by the portal server to the editor; and program code for retrieving services from the portal server to the editor based on a query from the editor.

A fourth aspect of the present invention provides a system for deploying an application for providing artifact and configuration cohesion across disparate portal application models, comprising: a computer infrastructure being operable to: launch an editor for a portal page in a client interface, and pass initial configuration parameters to the editor from a portal server; apply characteristics expressed by the portal server to the editor; and retrieve services from the portal server to the editor based on a query from the editor.

Therefore, the present invention provides a system, method and program product for providing artifact and configuration cohesion across disparate portal application models.

BRIEF DESCRIPTION OF THE DRAWINGS

These and other features of this invention will be more readily understood from the following detailed description of the various aspects of the invention taken in conjunction with the accompanying drawings in which.

Figure 1:
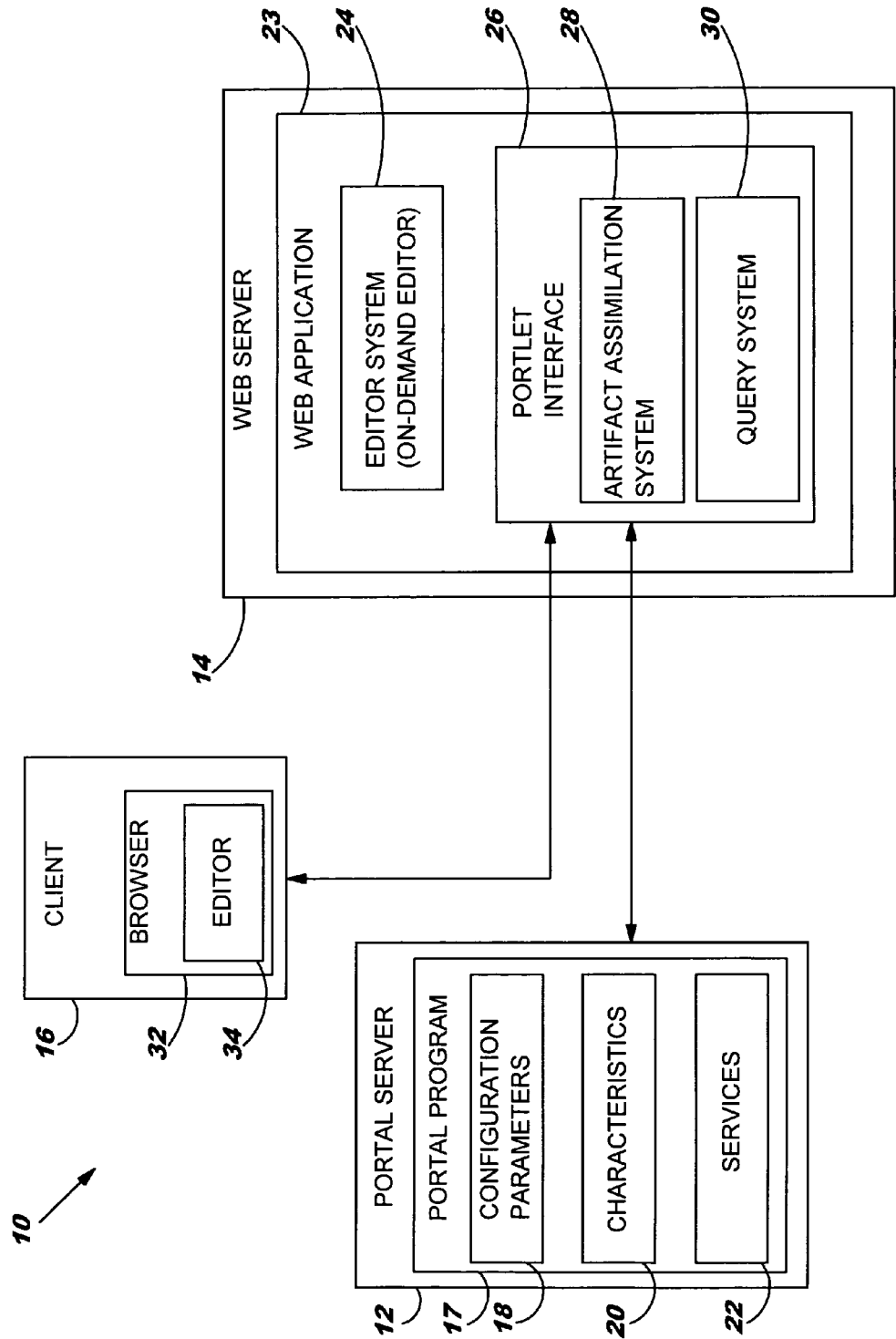
FIG. 1 depicts a system for providing artifact and configuration cohesion across disparate portal application models according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DESCRIPTION OF THE INVENTION

For convenience purposes, the Detailed Description of the Invention will have the following sections:

I. General Description
II. Computerized Implementation

I. General Description

As indicated above the present invention provides a system, method and program product for providing artifact and configuration cohesion across disparate portal application models. Specifically, under the present invention, a client-based editor is launched (e.g., from a web server or the like) within a client interface such as a browser. Upon being launched, initial configuration parameters are passed from a portal server to the editor. The present invention also provides a "communications tunnel" between the editor and the portal server in the form of a portlet interface on the web server. This is so that any characteristics expressed by the portal server (e.g., changes to the initial configuration parameters) can be pushed to the editor. Moreover, the portlet interface allows the editor to query the portal server to obtain any needed services (e.g. a spreadsheet computation).

Referring now to FIG. 1, a system 10 for providing artifact and configuration cohesion across disparate portal application models according to the present invention is shown. As depicted, system 10 depicts portal server 12, web server 14 and client 16. In general, the present invention allows a portal page to be edited/configured via browser 32 of client 16 without losing artifact or configuration cohesion with portal server 12. Moreover, such cohesion is achieved without data loss, or requiring data refresh or round-tripping. In one embodiment, portal server 12, web server 14 and client 16 can communicate over a network such as the Internet, a local area network (LAN), a wide area network (WAN), a virtual private network (VPN), etc. To this extent, communication through the network could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional IP-based protocol. It should be understood, however, that one or more of the "units" in FIG. 1 could be combined. For example, portal server 12 could be provided as an application running on web server 14.

Shown on portal server 12 is portal program 17, which is intended to represent any program for developing/maintaining portal pages such as WebSphere Portal Server. As shown, portal program 17 includes configuration parameters 18, characteristics 20 and services 22, whose roles will be further explained below. Further, shown on web server 14 is web application 23 that includes editor system 24 and portlet interface 26. Portlet interface 26 itself includes artifact assimilation system 28 and query system 30. It should be readily understood that portal program 17 and web application 23 will likely include other known components/systems that have not been shown in FIG. 1 or 2 for simplicity purposes. Moreover, system 10 is not intended to represent an entire architecture of a portal scenario. Rather, system 10 includes systems/components to explain the teachings of the present invention. To this extent, other known components such as actual portlets, a document management facility, etc., that have not been depicted should be understood to exist.

In any event, system 10 of the present invention allows a portal page to be edited from browser 32 of client 16 in a seamless manner such that artifact and configuration cohesion with portal server 12 is provided. To this extent, when a user desires to edit a portal page, editor system 24 of web application 23 will launch a stand-alone client editor 34 within browser 32 of client 16. In a typical embodiment, editor 34 is launched into a popup window or IFrame tag, which then loads all editor client resources. In the case of visual conformity, document manager portlet launches editor 34 in a popup window that is separate from a window in which portlet content is displayed. Listed below is sample code describing the launching of editor 34 in a pop-up window of browser 32:

--- window.open("http://yourco.com/editor/load?
css=yourco.com/wps/style.css&
param2=value2&...");

---

Upon launching editor 34, artifacts are expressed by passing initial configuration parameters 18 as a URL parameter to the new pop-up window in which editor 34 resides. One example of an artifact that would be passed to editor 34 is the portal styling encapsulated in a Cascading Style Sheet (CSS). In general, initial configuration parameters 18 are passed from a browser user-agent to the server-side of the standalone web application 23, and are used to construct the client portion of the application (such as insertion of a <LINK> tag for the styling attributes). In much the same manner, other artifacts such as resource configuration can be shared.

In addition to providing a client or browser-based editor, the present invention will also provide a communications tunnel/channel between editor 34 and portal server 12 to provide cohesion therebetween. Specifically, as shown and indicated above, web server 14 includes portlet interface 26. In general, portlet interface 26 provides a medium by which client 16 or editor 34 can send and receive communications from portal server 12. This is especially useful after editor 34 has been launched. Specifically, once editor 34 is launched in browser 32, portlet interface 26 can be used for dynamic artifact assimilation. That is, after being launched and placed in use, editor 34 should assimilate the characteristics 20 expressed by the portal server 12. Such characteristics 20 can include any changes to initial configuration parameters 18. For example, after editor 34 is launched, assume that the operator of editor 34 decides to use portal configuration screens to modify the settings of editor 34 (e.g., such as modifying the rows and columns displayed on a spreadsheet editor). Since in a portal environment configuration settings are usually co-located on "edit" or "configuration" setting pages, a way to apply these configuration changes to the already launched editor 34 is needed.

Portlet interface 26 provides this solution. Specifically, portlet interface 26 provides a tunneling/channeling mechanism between the editor 34's rich scripting and the portal server 12. The difficulty with any tunneling approach in this environment is that typically the normal navigation that takes place on the parent portal pages to apply configuration changes causes any established object references to be destroyed and thus, broadcasting the values to the editors becomes impossible. To circumvent this issue, artifact assimilation system 28 provides a timed tunnel that facilitates the polling of portal server 12 from editor 34 for a particular variable that is indicative of whether any configuration parameters 18 have become "stale" or changed. One example of such a variable could be a unique identifier that corresponds to editor 34. The use of a simple variable to check for changes eliminates the concern of performance problems of checking the parent window through scripting on a short time interval. If changes are detected the tunnel can be reestablished by the editor and artifacts expressed.

To be a source of artifacts to "push" to editor 34, a hidden artifact expression using scripting is introduced. Specifically, if any changes to the editor configurations are made, the portlet expresses the changes through a hidden form that has fields predicated with the editor instance identifier (in case there are multiple editors open). Accordingly, each instance of editor 34 is initially launched with a corresponding identifier with the following illustrative code:

window.open("http:// . . . ", "EditorID", . . . );

Once launched, editor 34 can poll portal server 12 at time intervals via artifact assimilation system 28 to check for the existence of a "document.EditorID=true" variable, which indicates there are changes pending for editor 34. If so, editor 34 will then reestablish a communication channel with portal server 12 through the "window.opener" notion and read the configuration changes as expressed below in the portlet markup by walking portal server 12's DOM through scripting. Any subsequent portal pages navigated continue to express the configuration changes until editor 34 has read the data and signaled by changing the expression variable. The following code is illustrative of this function:

```
<FRAME id="EditorExpression">
    <INPUT type="hidden" id="EditorID:row" value="50">
    <INPUT type="hidden" id="EditorID:col" value="25">
    ...
    <INPUT type="hidden" id="EditorID:key" value="val">
</FRAME>
```

After the configuration is read, the expression variable flag is set to "document.EditorID=false" and editor 34 resumes checking for changes to configuration. In much the same way other artifacts can be expressed, such as the current portal styling.

A further use for the tunnel provided by portlet interface 26 is for editor 34 to query portal server 12 via query system 30 for needed services 22. Specifically, after editor 34 is launched and being used, it is occasionally advantageous to query portal server 12 for services 22, such as performing a complex computation in a spreadsheet. Specifically, based on a request from editor 34, query system 30 will query portal server 12 for the needed service 22. In a typical embodiment, editor 34 is provided with a callback URL to a particular portlet to invoke a portlet "action." Since the action URL can change across sessions, a new URL will be statically provided to editor 34 using the static artifact expression as described above. The script then calls this URL passing any parameters as part of the URL request that can be obtained by the portlet code in the action call. The portlet action then invokes the service 22 and returns an XML page with the results of the query. In one example, editor 34 calls the portlet from a hidden IFrame in the editor with a URL similar to the following:

http://myportal.com/wps/portlet123/session123/<action>?<parameters>

The contents of the IFrame would then be populated from the results of the service request. The editor script can then read and parse the XML contents of the document after the onLoad event and assimilate it into the editor as appropriate.

As can be seen, the approach provided by the present invention provides for the cohesion of artifacts and configuration across the disparate programming models.

II. Computerized Implementation

Figure 2:
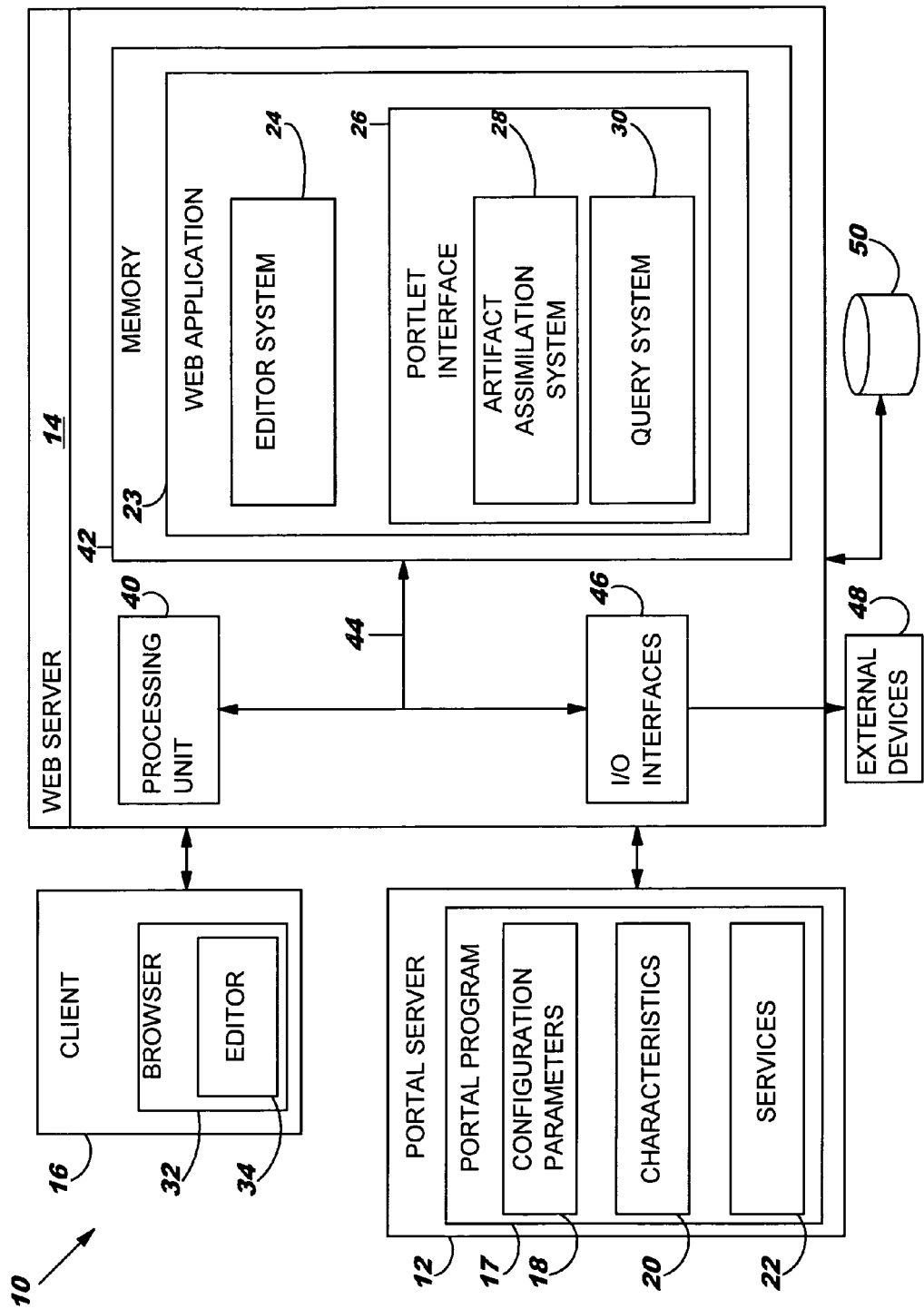
FIG. 2 depicts a computerized implementation of the system of FIG. 1.

Referring now to FIG. 2, a more specific computerized implementation of system 10 is shown. As depicted, web server 14 generally includes processing unit 40, memory 42, bus 44, input/output (I/O) interfaces 46, external devices/resources 48 and storage unit 50. Processing unit 40 may comprise a single processing unit, or be distributed across one or more processing units in one or more locations, e.g., on a client and server. Memory 42 may comprise any known type of data storage and/or transmission media, including magnetic media, optical media, random access memory (RAM), read-only memory (ROM), a data cache, a data object, etc. Moreover, similar to CPU 40, memory 42 may reside at a single physical location, comprising one or more types of data storage, or be distributed across a plurality of physical systems in various forms.

I/O interfaces 46 may comprise any system for exchanging information to/from an external source. External devices/resources 48 may comprise any known type of external device, including speakers, a CRT, LED screen, hand-held device, keyboard, mouse, voice recognition system, speech output system, printer, monitor/display, facsimile, pager, etc. Bus 44 provides a communication link between each of the components in web server 14 and likewise may comprise any known type of transmission link, including electrical, optical, wireless, etc.

Storage unit 50 can be any system (e.g., a database, etc.) capable of providing storage for information under the present invention. As such, storage unit 50 could include one or more storage devices, such as a magnetic disk drive or an optical disk drive. In another embodiment, storage unit 50 includes data distributed across, for example, a local area network (LAN), wide area network (WAN) or a storage area network (SAN) (not shown). Although not shown, additional components, such as cache memory, communication systems, system software, etc., may be incorporated into web server 14. Moreover, it should be understood that although not shown for simplicity purposes, portal server 12 and client 16 will likely include computerized components similar to web server 14.

Shown in memory 42 of web server 14 is web application 23, which as indicated above, includes editor system 24 and portlet interface 26. As described above, editor system 24 launches editor 34 in browser 32 of client. Editor 34 is typically launched in a window (e.g., pop-up) separate from which portlet content or the like is displayed. Moreover, as editor 34 is launched, initial configuration parameters 18 will be passed thereto. Once editor 34 is launched, portlet interface 26 will provide a tunneling/channeling mechanism between editor 34 and portal server 12 to ensure seamless artifact and configuration cohesion therebetween. In particular, after editor 34 is launched, portal server 12 will be polled via artifact assimilation system 28 so that any characteristics 20 expressed by portal server 12 can be "pushed" to editor 34. Moreover, editor 34 can query portal server 12 via query system 30 to "pull" any needed services 22.

It should be appreciated that the teachings of the present invention could be offered as a business method on a subscription or fee basis. For example, portal server 12, web server 14 and/or web application 23 of FIGS. 1 and 2 could be created, maintained, supported and/or deployed by a service provider that offers the functions described herein for customers. That is, a service provider could offer to provide artifact and configuration cohesion across disparate portal application models as described above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of portlet interface 26 of FIGS. 1 and 2 is intended to be illustrative only. Moreover, it should be understood that the teachings of the present invention could be implemented outside of the portal-editor domain. For example, the teachings herein could be used for a web application-flash combination to provide the same form of tunneling and querying services.

We claim:

1. A system for providing artifact and configuration cohesion across disparate portal application models, comprising a memory that stores:

an editor system for launching an editor for a portal page in a client interface, the editor being a standalone browser client-side application included in a client-side component associated with the portal page, and for passing initial configuration parameters from a portal server to the editor as a URL parameter to a new pop-up window in which the editor resides;

an artifact assimilation system for applying characteristics expressed by the portal server to the editor after the launch and for polling the portal server using a variable that is indicative of changed characteristics to be applied to the editor, the variable comprising an identifier corresponding to the editor; and a query system for retrieving services from the portal server by the editor, wherein the system provides artifact and configuration cohesion between the portal page and the client side component after the launch without data loss, without requiring data refresh, and without round-tripping.

2. The system of claim 1, wherein the system is embodied on a web server that communicates with the portal server and the editor.

3. The system of claim 1, wherein the artifact assimilation system and the query system are embodied within an interface that facilitates communication between the portal server and the editor.

4. The system of claim 1, wherein the characteristics comprise changes to the initial configuration parameters.

5. The system of claim 1, wherein the editor system launches the editor in a different window than a window in which portal content is displayed.

6. The system of claim 1, wherein the client interface comprises a web browser.

7. A method for providing artifact and configuration cohesion across disparate portal application models, the method implemented by a computer and comprising:

passing initial configuration parameters to an editor from a portal server as a URL parameter to a new pop-up window in which the editor resides, the editor being a standalone browser client-side application that is launched for the portal page in a client interface, the editor being included in a client-side component associated with the portal page;

applying characteristics expressed by the portal server to the editor after the launch;

polling the portal server using a variable that is indicative of changed characteristics to be applied to the editor, the variable comprising an identifier corresponding to the editor; and retrieving services from the portal server by the editor, wherein the method provides artifact and configuration cohesion between the portal page and the client side component after the launch without data loss, without requiring data refresh, and without round-tripping.

8. The method of claim 7, wherein the method is executed on a web server which includes an interface for facilitating communication between the portal server and the client interface.

9. The method of claim 7, wherein the characteristics comprise changes to the initial configuration parameters.

10. The method of claim 7, wherein the editor is launched in a different window than a window in which portal content is displayed.

11. The method of claim 7, wherein the client interface comprises a web browser.

12. A program product stored on a tangible storage medium for providing artifact and configuration cohesion across disparate portal application models, which when executed comprises:

program code for passing initial configuration parameters from a portal server as a URL parameter to a new pop-up window in which an editor resides, the editor being a standalone browser client-side application that is launched for the portal page in a client interface, the editor being included in a client-side component associated with the portal page;

program code for applying characteristics expressed by the portal server to the editor after the launch;

program code for polling the portal server using a variable that is indicative of changed characteristics to be applied to the editor, the variable comprising an identifier corresponding to the editor; and program code for retrieving services from the portal server by the editor, wherein the program product provides artifact and configuration cohesion between the portal page and the client side component after the launch without data loss, without requiring data refresh, and without round-tripping.

13. The program product of claim 12, wherein the program product is loaded on a web server that communicates with the portal server and the editor.

14. The program product of claim 12, wherein the program code for applying characteristics, the program code for polling, and the program code for retrieving services are embodied within an interface that facilitates communication between the portal server and the editor.

15. The program product of claim 12, wherein the characteristics comprise changes to the initial configuration parameters.

16. The program product of claim 12, wherein the editor is launched in a different window than a window in which portal content is displayed.

17. A system for deploying an application for providing artifact and configuration cohesion across disparate portal application models, comprising:

a computer infrastructure comprising memory storing instructions, the instructions operable to:

pass initial configuration parameters to an editor from a portal server as a URL parameter to a new pop-up window in which the editor resides, the editor being a standalone browser client-side application that is launched for the portal page in a client interface, the editor being included in a client-side component associated with the portal page;

apply characteristics expressed by the portal server to the editor after the launch;

poll the portal server using a variable that is indicative of changed characteristics to be applied to the editor, the variable comprising an identifier corresponding to the editor; and retrieve services from the portal server by the editor, wherein the system provides artifact and configuration cohesion between the portal page and the client side component after the launch without data loss, without requiring data refresh, and without round-tripping.

18. The method of claim 7, wherein the variable comprising the identifier corresponding to the editor is created by the portal server to identify the editor, and is passed from the portal server to the editor in the initial configuration parameters.

19. The method of claim 7, further comprising:

using the variable, by the portal server responsive to the polling, to locate stored changes made to the configuration parameters after the launch; and returning the located stored changes by the portal server to the editor as characteristics expressed by the portal server.

20. The method of claim 19, wherein the returned stored changes are communicated to the editor as a hidden form that has fields predicated with a value of the variable.

21. The method of claim 7, wherein:

retrieving services from the portal server further comprises invoking a callback URL communicated to the editor by the portal server, the callback URL being dynamically changeable and communicated to the editor using a data structure which stores changes made to the configuration parameters after the launch.

22. The method of claim 7, wherein the retrieved services further comprise results of a spreadsheet invocation and further comprising displaying the results in the new pop-up window in which the editor resides.

* * * * *